Patented Oct. 17, 1950

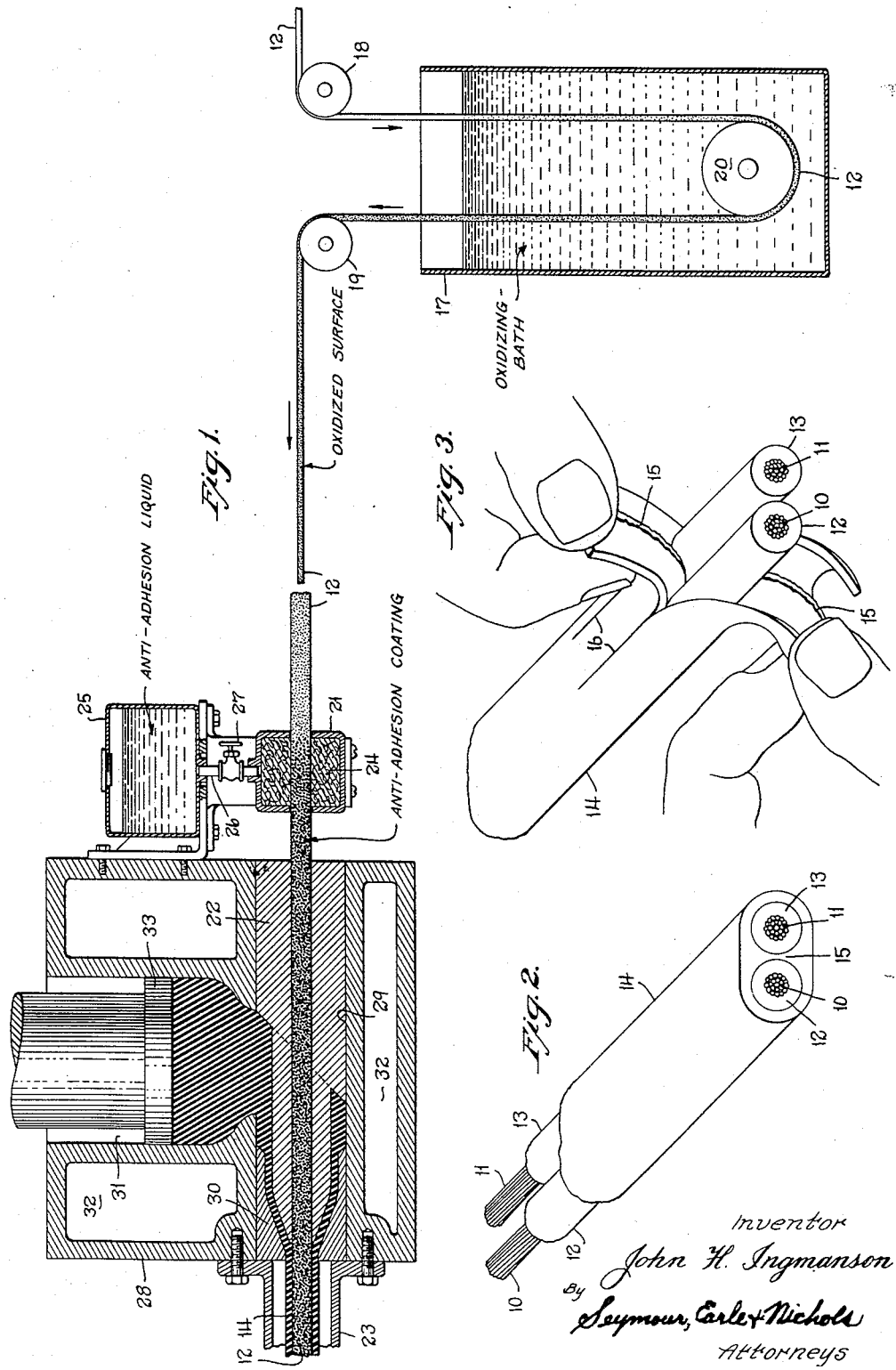

2,526,483

UNITED STATES PATENT OFFICE 2,526,483

METHOD OF MINIMIZING ADHESION BETWEEN RUBBER INSULATION LAYERS OF ELECTRIC CONDUCTORS AND THE RESULTANT ARTICLE

John H. Ingmanson, New Haven, Conn., assignor to The Whitney Blake Company, Hamden, Conn., a corporation of Connecticut Application April 26, 1949, Serial No. 89,648

6 Claims. (Cl. 18—59)

1

The present invention relates to improvements in methods for producing electric conductors having multiple layers of rubber, and relates more particularly to methods for minimizing adhesion between such multiple layers of rubber as well as to the resultant article.

It may here be explained that in electric conductors having multiple layers of rubber insulation, it is desirable for some purposes to enable the user to readily strip one layer of rubber from another, in order to permit the ready separation of multiple conductors, and for other purposes well known in the art.

Heretofore, it has been the practice, in order to minimize adhesion between layers of rubber insulation of the character above referred to, to coat an inner layer with a dust such, for instance, as talc or the like. The use of talc or the like should, theoretically, serve to provide reasonably satisfactory results, but it is an extremely difficult task to apply such dust-like materials in sufficient amount and sufficiently uniformly to an inner layer of rubber so as to reliably minimize the adhesions referred to.

Furthermore, the use of talc or similar dusty materials to minimize adhesion between layers of rubber occasions so much friction in the extrusion apparatus as to cause frequent breakages of the wire.

The main object of the present invention is to provide a superior method whereby an electric conductor may be rapidly and economically provided with multiple layers of rubber insulation, which latter will not adhere to such a degree as will preclude the convenient stripping of one such layer from another.

A further object of the present invention is to provide a superior method which will produce the results just above referred to and in addition enable an outer sheath of rubber to be applied by means of an extrusion apparatus without occasioning the frequent breakage of the conductors.

Another object of the present invention is to provide a superior electric conductor having multiple layers of insulation and having the outer surface of an inner layer of such insulation of such uniform non-bonding character as will permit the ready separation of an outer layer of insulation therefrom.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a schematic view mainly in vertical central section and partly in elevation illustrating

2 an apparatus suitable for carrying out the method of the present invention;

Fig. 2 is a perspective view of a fragment of double-conductor electric wire having two layers of rubber insulation and capable of being produced by the apparatus illustrated in Fig. 1; and Fig. 3 is a perspective view similar to Fig. 2 but showing the facility with which the outer layer of rubber insulation may be stripped from the respective inner layers of the two electric conductors or wires.

As will be apparent from the following considered in conjunction with the accompanying drawings, the method of the present invention contemplates the application of an outer layer of rubber insulation over an inner layer of rubber insulation which contains an electric conductor, but only after such inner layer has had its outer surface oxidized and subsequently coated with a suitable combined lubricant and anti-adhesion liquid which the latter is, by the said oxidized surface, precluded from injuring such inner layer.

For purposes of making clear a preferred mode of carrying out the present invention, there is illustrated in the accompanying drawings a conductor which includes two bundles of electric wires respectively designated by the reference characters 10 and 11, which bundles are insulated by being respectively provided with layers or sheaths of rubber insulation 12 and 13. Jointly laterally enveloping both of the inner layers or sheaths 12 and 13 is an outer layer or sheath 14 also formed of suitable rubber insulating material and having a thin but definite web or wall 15 located between the two said layers 12 and 13. In the drawings, the thickness of the web 15 is slightly exaggerated over normal in order to make the illustration clearer.

Normally the task of effectively insulating the bundles of electric wires 10 and 11 is taken care of by the inner layers or sheaths 12 and 13 respectively. The outer sheath or layer 14 is employed mainly as mechanical protection and, in the present instance, to mechanically bind the two inner sheaths 12 and 13 into a unitary plural conductor, though the said outer sheath also is of insulating material.

As before pointed out, it is the main object of the present invention to enable the outer layer or sheath 14 to be readily parted from one or more inner layers or sheaths, such as 12 and 13, in the manner indicated in Fig. 3. To effect the separation referred to, it is common practice in the art to provide the said outer layer or sheath 14 with one or more longitudinal slits or cuts 16, indicated in Fig. 3, following which the said outer layer may be pulled back to thus lay bare the inner layers or sheaths 12 and 13 and to tear the thin web or wall 15.

To enable the operation illustrated in Fig. 3 to be readily performed, any suitable apparatus may be employed for treating the surfaces of the previously-vulcanized inner layers or sheaths 12 and 13 and for applying the outer layer or sheath 14 thereover. In the accompanying drawings, there is illustrated a tank 17 adapted to contain a suitable oxidizing bath such as liquids of the following general nature, for instance:

(a) 2 parts sodium hypochlorite, 1 part hydrochloric acid and about 200 parts water;

(b) About 0.2% to about 0.6% bromine dispersed in a suitable solvent such as carbon tetrachloride, methylene chloride, carbon disulphide or the like;

(c) About 0.3% to about 0.8% sulphur chloride (preferably monochloride) dispersed in a suitable solvent such as carbon tetrachloride or the like.

Located over the open upper end of the tank 17 are two pulleys 18 and 19 and located adjacent the bottom of the said tank below the liquid level therein is another pulley 20.

The two bundles of electric wires 10 and 11 with their respective previously-vulcanized rubber sheaths 12 and 13 applied thereover, are led from any suitable reel or other source of supply (not shown) over the pulley 18 and thence downwardly into the tank 17 around the pulley 20 and back up over the pulley 19, all as indicated in Fig. 1. The wire is then led horizontally to the left (as viewed in Fig. 1) through an apertured casing 21, thence through a guide-tube 22 (forming a feature of an extrusion apparatus) and thence outwardly through a tube 23, which may be of any desired length and which may be heated to effect the vulcanization of the outer sheath 14 should such vulcanization be required.

The casing 21 before referred to contains in its interior a mass of felted material 24 such, for instance, as cotton waste, to which a suitable anti-adhesion and lubricating material may be fed from a tank 25 through a pipe 26 having a control-valve 27 therein, all as indicated in Fig. 1.

The extrusion apparatus of which the guide-tube 22 before referred to forms a feature, also includes a body-member 28 in a passage 29 of which the said guide-tube 22 is rigidly mounted. The said passage 29 extends from end to end of the body-member 28 and in addition to holding the guide-tube 22, also holds a die-member 30.

Above its horizontal passage 29 before referred to, the body-member 28 is formed with a vertical charge-receiving chamber 31 having a contracted lower portion communicating with the intermediate portion of the passage 29 and hence also in communication with the passage formed between the left portion of the guide-tube 22 and the die-member 30.

Preferably, the body-member 28 is hollowed out to provide a heating-chamber 32 surrounding the charge-receiving chamber 31 and the longitudinal passage 29 in which the parts 22 and 30 are located. A suitable heating-fluid may be passed through the heating-chamber 32 in any suitable manner, as is well known in the art.

The charge-receiving chamber 31 may be filled with a hot plastic mass of any desired rubber compound from which it is desired to form the outer sheath or layer 14. For the purpose of forcing the plastic insulating material out of the lower portion of the charge-receiving chamber 31 and coincidentally onto the exteriors of the inner sheaths 12 and 13 to form the outer sheath 14, there is provided a ram 33, which latter may be forced downwardly, as required, by any suitable means well known in the art.

As will be apparent by reference to the left-hand portion of Fig. 1, the tube 23 is mounted upon the body-member 28 in axial alignment with the guide-tube 22 and die-member 30, while the unit comprising the casing 21 and elements 24, 25, 26 and 27 is attached, for convenience, to the end of the body-member 28 opposite the tube 23. It will be further noted that the casing 21 is so positioned as to permit the conductor to pass therethrough and through the body of felted material 24 without deflecting the conductor out of its normal path.

Both the inner sheaths 12—13 and the outer sheath 14 may be formed of natural rubber compounds, synthetic rubber compounds, or mixtures thereof and all of which are characterized by having a tendency to adhere to other rubbers against which they are placed especially when hot. Among the synthetic rubbers found suitable may be mentioned butyl rubber compounds and neoprene rubber compounds.

The anti-adhesion material which may be placed in the tank 25 for being fed to the felted material 24 (and thence to the surfaces of the sheaths 12 and 13) may assume a wide variety of forms such, for instance, as glycerine, ethylene glycol, diethylene glycol and triethylene glycol or mixtures thereof either undiluted or diluted with water or any other suitable solvent.

The two bundles of electric wires 10 and 11 each with its respective vulcanized rubber sheaths 12 and 13 may be drawn from any suitable reel or other source of supply and passed over the pulleys 18, 20 and 19 and thence through the other features of the apparatus, as indicated in Fig. 1. In Fig. 1, only one of the sheaths, namely, 12, shows in the foreground since the remaining one is in the background.

The pair of sheaths 12 and 13 together with their respective bundles of electric wires 10 and 11 may be drawn through the apparatus by any suitable means common in the art and operating to maintain the strands under tension.

As the sheaths 12 and 13 pass through the oxidizing liquid contained within the tank 17, their surfaces will be oxidized to a sufficient degree as they complete their passage through the solution, which oxidized surface is indicated by the fine stippling in Fig. 1. The time of exposure of the sheaths 12 and 13 to the various oxidizing liquids may vary over a wide range. For instance, the respective times of exposure at room temperatures for the various oxidizing baths (a), (b) and (c) may be respectively about 15 to 20 seconds, 10 to 20 seconds and 10 to 20 seconds.

After having their surfaces oxidized and dried, the sheaths 12 and 13 will pass through the mass of felted material 24 and will there receive a thin coating of anti-adhesion material from the contents of the tank 25, which material will thoroughly wet and cover the previously-oxidized surfaces, in the manner indicated by the coarse stippling in Fig. 1. The anti-adhesion material not only serves to reduce or substantially eliminate the tendency of the outer sheath 14 to stick to the inner sheaths 12 and 13, but also will serve as a lubricant to enable the said sheaths to pass through the guide-tube 22 without such frictional resistance as might cause the breakage of the strands.

As the now-coated sheaths 12 and 13 pass out of the left end of the guide-tube 22, they will have extruded upon them the outer layer or sheath 14, as is indicated at the left of Fig. 1. This outer layer is then vulcanized.

It will be understood, that in accordance with customary practice in the art, the speed at which the two strands comprising respectively the elements 10—12 and 11—13 are pulled through the extrusion apparatus, will be synchronized with the downward movement of the ram 33 so as to insure the proper application of the outer sheath or layer 14 over the said strands.

Under some conditions, it is preferred to oxidize the surfaces of the inner sheaths 12 and 13 as a separate operation and to store the same together with their conductors 10 and 11, upon a suitable reel for later being provided with an outer sheath such as 14.

The oxidation of the surfaces of the inner sheaths 12 and 13 as before described after vulcanization and prior to the application of the anti-adhesion liquid, will serve to prevent the appreciable penetration of such liquid into the rubber from which the said inner sheaths are formed, to thus not only guard against the use of an undue amount of anti-adhesion liquid, but also to guard against the deterioration of the said inner sheaths.

Furthermore, the said anti-adhesion liquid thoroughly lubricates the said inner sheaths and thereby relieves them of such frictional restraint as would occasion frequent breakages as the strands are pulled through the extrusion apparatus.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The method for minimizing adhesion between layers of rubber insulation on an electric conductor, comprising: passing an insulated wire having a vulcanized rubber insulating-sheath through an oxidizing-bath and thereby oxidizing the outer surface of the rubber insulating-sheath thereof and rendering the said surface suitable for the uniform distribution thereover of the hereinafter-mentioned anti-adhesion liquid and minimizing the penetration of the latter into the said sheath; subsequently coating the now-oxidized surface of the aforesaid insulating-sheath with an anti-adhesion liquid; and, after the application of the said liquid and while the same is still in place, applying an outer rubber sheath over the first-mentioned rubber insulating-sheath and its said coating, and then vulcanizing said outer rubber sheath.

2. The method for minimizing adhesion between layers of rubber insulation on an electric conductor, comprising: passing an insulated wire having a rubber insulating-sheath through an oxidizing-bath and thereby oxidizing the outer surface of the rubber insulating-sheath thereof and rendering the said surface suitable for the uniform distribution thereover of the hereinafter-mentioned anti-adhesion liquid and minimizing the penetration of the latter into the said sheath; subsequently wiping on a coating of anti-adhesion liquid over the now-oxidized surface of the aforesaid insulating-sheath; and, after the application of the said liquid and while the same is still in place, applying an outer rubber sheath over the first-mentioned rubber insulating-sheath and its said coating.

3. The method for minimizing adhesion between layers of rubber insulation on an electric conductor, comprising: passing an insulated wire having a rubber insulating-sheath through an oxidizing-bath and thereby oxidizing the outer surface of the rubber insulating-sheath thereof and rendering the said surface suitable for the uniform distribution thereover of the hereinafter-mentioned anti-adhesion liquid and minimizing the penetration of the latter into the said sheath; subsequently coating the now-oxidized surface of the aforesaid insulating-sheath with an anti-adhesion liquid; and, after the application of the said liquid and while the same is still in place, hot-extruding an outer rubber sheath over the first-mentioned rubber insulating-sheath and its said coating.

4. The method for minimizing adhesion between layers of rubber insulation on an electric conductor, comprising: passing an insulated wire having a vulcanized rubber insulating-sheath through an oxidizing-bath and thereby oxidizing the outer surface of the rubber insulating-sheath thereof and rendering the said surface suitable for the uniform distribution thereover of the hereinafter-mentioned anti-adhesion liquid and minimizing the penetration of the latter into the said sheath; subsequently wiping on a coating of anti-adhesion liquid over the now-oxidized surface of the aforesaid insulating-sheath; and, after the application of the said liquid and while the same is still in place, hot-extruding an outer rubber sheath over the first-mentioned rubber insulating-sheath and its said coating, and then vulcanizing said outer rubber sheath.

5. An electric conductor having multiple layers of readily-separable rubber and including in combination: an electric conductor; a first insulating-sheath of rubber enveloping the said electric conductor and having an oxidized outer surface; an anti-adhesion liquid covering the said oxidized surface; and a second sheath of rubber enveloping the said first insulating-sheath of rubber and the said anti-adhesion coating thereon.

6. A plural electric conductor having multiple conductors and multiple layers of readily-separable rubber and including in combination: a plurality of electric conductors; a plurality of inner insulating-sheaths of vulcanized rubber respectively enveloping the said electric conductors and each having an oxidized outer surface; an anti-adhesion liquid covering the said oxidized surfaces; and an outer sheath of vulcanized rubber jointly enveloping the said inner insulating-sheaths of rubber and the respective anti-adhesion coatings thereon.

JOHN H. INGMANSON.

REFERENCES CITED

The following references are of record in the file of this patent:

UNITED STATES PATENTS

| Number | Name | Date |
|---|---|---|
| 1,940,917 | Okazaki | Dec. 26, 1933 |
| 1,968,903 | Norton | Aug. 7, 1934 |
| 2,099,103 | Cox | Nov. 16, 1937 |
| 2,204,782 | Wermine | June 18, 1940 |
| 2,207,815 | Ogilby | July 16, 1940 |
| 2,387,498 | Cox | Oct. 23, 1945 |

FOREIGN PATENTS

| Number | Country | Date |
|---|---|---|
| 17,235 | Australia | Apr. 20, 1934 |
| 834,353 | France | Aug. 16, 1938 |